Feb. 2, 1960     L. J. BERMAN ET AL     2,923,780
MAGNETIC TRANSDUCER AND HOUSING
Filed March 2, 1955
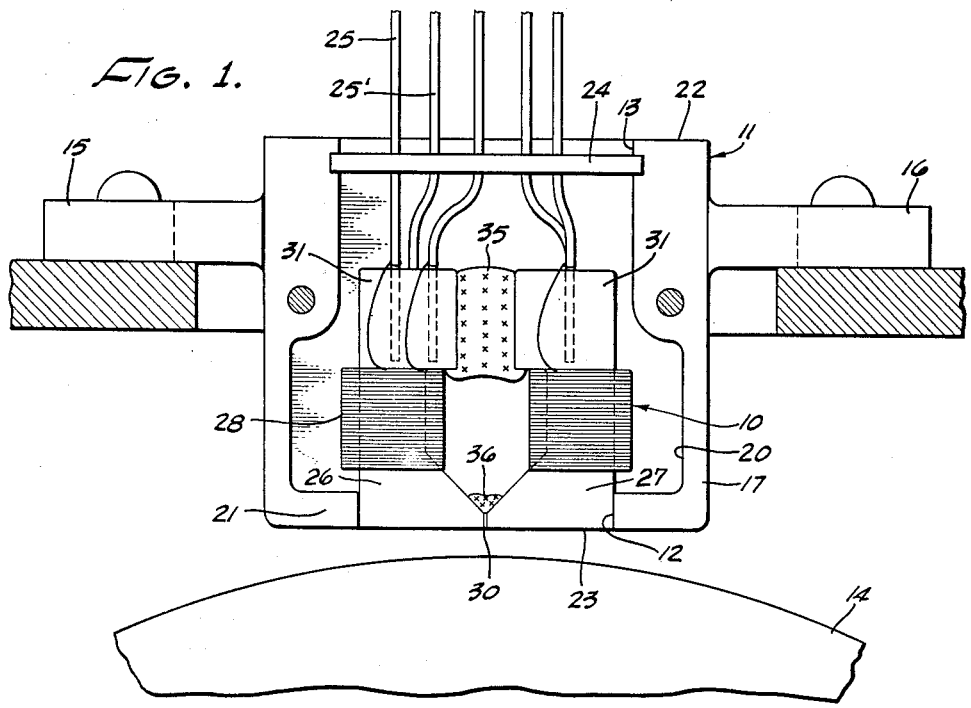
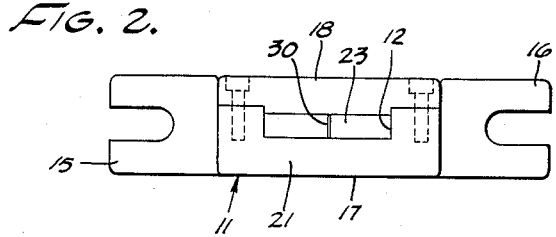
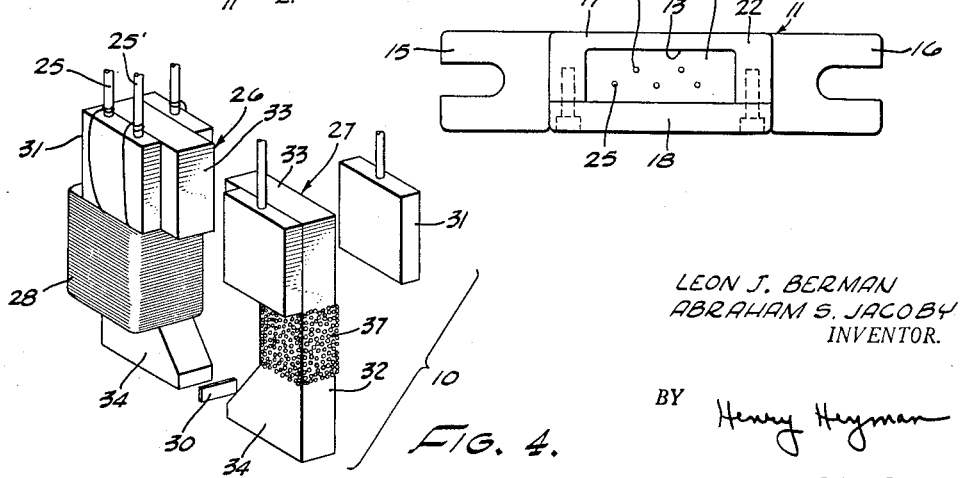
LEON J. BERMAN
ABRAHAM S. JACOBY
INVENTOR.
BY Henry Heyman
ATTORNEY – # United States Patent Office 2,923,780
Patented Feb. 2, 1960

2,923,780

MAGNETIC TRANSDUCER AND HOUSING

Leon J. Berman, Culver City, and Abraham S. Jacoby, Los Angeles, Calif., assignors to Hughes Aircraft Company, Culver City, Calif., a corporation of Delaware Application March 2, 1955, Serial No. 491,612

11 Claims. (Cl. 179—100.2)

The present invention relates to magnetic transducers and more particularly to an electro-magnetic transducer and mounting comprising a housing which is resistant to mechanical and thermal shock.

The use of magnetic storage devices for storing digital information for electronic computers has become well established in the field. Such storage devices frequently take the form of rotating drums of magnetizable material, with electro-magnetic transducers arranged adjacent to the surface thereof. These transducers are connected to external circuitry which cause excitation of the transducer with a current representing the information to be stored. The transducer in turn produces an external magnetic field which magnetizes the portion of the drum surface adjacent the transducer in accordance with the transducer's exciting current. The stored information may be recovered by means of other transducers in which currents are induced by the passage of the magnetized record area.

The state of the art at the present time generally requires that the transducers be fixed approximately 1/1000 of an inch or one mil from the drum surface in order to produce satisfactory output signals with presently available magnetic materials. Accordingly, it is necessary to maintain a high order of dimensional accuracy in the transducer-drum assembly.

At the same time, the materials utilized in transducer fabrication themselves have a wide range of response to mechanical shock and temperature variation. For example, the ferrites, which are frequently utilized as core material for transducers because of their high efficiency, are extremely brittle and frangible, and often shatter when subjected to thermally or mechanically induced stress. Similarly, the copper wire utilized in fabricating the exciting coils for transducers has a high coefficient of thermal expansion, which frequently causes failure of the insulation under extreme temperature variations.

For these reasons, it has been necessary to maintain drum-transducer assemblies in an environment free from extremes of temperature and mechanical vibration. Such environmental conditions are easily maintained for computers located in fixed installations. However, where it is desired to utilize a magnetic drum in a mobile computer, such as a plane or ship, where optimum environmental conditions cannot be maintained, the presently available transducers and mountings have been found to be unsatisfactory.

Accordingly, it is an object of the present invention to provide an improved electro-magnetic transducer and mounting comprising a housing which may be used in conjunction with a magnetite drum under extreme contentions of mechanical and thermal shock.

Another object of the present invention is to provide an improved electro-magnetic transducer of high efficiency which is mechanically and electrically stable under conditions of extreme vibration and thermal cycling.

A further object of the present invention is to provide an electro-magnetic transducer and housing utilizing conventional materials which may be operated under a wide range of thermal conditions.

Yet another object of the present invention is to provide an easily fabricated, highly efficient and sensitive electro-magnetic transducer and housing therefor which may be operated over a broad range of temperatures, and under conditions of extreme mechanical vibration and shock.

An electro-magnetic transducer and mounting comprising a housing according to the present invention comprises an electro-magnetic transducer having a pair of ferrite core pieces shaped to provide a front gap in the core structure across which fringing flux may be developed, said front gap having a shim of highly conductive material positioned therein; and a housing having a cavity therein for receiving said transducer, said housing and said cavity being of such dimension that no part of said transducer touches the inner surface of the cavity at any point, said housing having a base portion having an aperture therein, the aperture being of such dimension as to permit the pole-face end of said transducer to pass therethrough, and said base portion being of sufficient thickness to provide an inner surface on said aperture to which said transducer may be adhesively fastened.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Fig. 1 is a front elevational view, partly in section, of an electro-magnetic transducer and housing according to the present invention;

Fig. 2 is a bottom plan view of the pole-face end of the transducer and housing of Fig. 1;

Fig. 3 is a top plan view of the transducer and housing of Fig. 1; and

Fig. 4 is a view in perspective partially exploded illustrating the transducer of Fig. 1 in greater detail.

Referring now to the drawing wherein the same reference character refers to the same or similar elements in the several views, as shown in Fig. 1, an electro-magnetic transducer and mounting comprising a housing according to the present invention includes a transducer head 10 mounted in and supported by a housing 11. Housing 11 has a pair of apertures 12 and 13 therein for respectively presenting the pole-face end of transducer 10 to a magnetic drum or similar recording surface 14, and for passing leads for establishing electrical connection between transducer 10 and an external circuit, not shown. Housing 11 has a pair of lugs 15 and 16 for rigidly fastening the housing to a supporting structure, which may be a part of the drum supporting structure.

More particularly, and as will be more readily comprehended by considering Figs. 2 and 3 in conjunction with Fig. 1, housing 11 is made in two parts, a housing body 17 and a housing cover plate 18. Fig. 1 essentially represents the view of the transducer and housing assembly which would be seen upon removing cover plate 18. As shown in Fig. 1, housing body 17 has a hollow inner cavity 20 of such dimension as to receive transducer 10, a base portion 21, and a top portion 22. Base portion 21 and top portion 22 each have a rectangular recess cut out therein, respectively, the recesses serving to form apertures 12 and 13 when cover plate 18 is in place. More particularly, the recess in base portion 21 is rectangular in shape, having a length substantially equal to the length of the pole-face end of transducer 10, and a depth slightly greater than the thickness of the pole-face end of the transducer. A lip of appropriate size on cover plate 18 protrudes into the recess in base portion 21 when cover plate 18 is in place, the lip being of sufficient size to close the remaining portion of the recess not occupied by the transducer. Base portion 21 is of sufficient thickness to provide an inner surface on the recess therein to which the transducer 10 may be fastened, by means of glue or a similar adhesive. An adhesive suitable for such application has been found to be the "Araldite" brand of epoxy resin.

Housing 11 and cavity 20 therein are of such dimension that no part of transducer 10 touches the inside surface of the cavity at any point. Transducer 10 is positioned in cavity 20 of housing body 17 with its pole-face end 23 positioned in the recess in base portion 21 in such manner that the surface of the pole-face end 23 and the outer surface of base portion 21 are flush and form a continuous surface.

A piece or plate of plastic or similar insulating material 24 is positioned within a recess cut into the inner edge of the recess in top portion 22, the plate either being glued in place or being retained by pressure of cover plate 18 when the cover plate is in place. Plate 24 itself has a plurality of apertures for passing electrical leads 25, 25', thereby maintaining the leads in fixed relationship to and insulated from the sides of housing 11 and the edges of aperture 13. Alternatively, aperture 13 may be merely an aperture in housing 11 through which leads 25, 25' pass. Cover plate 18 may be retained in place by means of screws or similar fasteners, as shown.

It will be recognized that the transducer and housing thus described provide that the transducer and housing are in contact at only a narrow band about the transducer immediately adjacent its pole-face end, the transducer being maintained in place by means of a layer of adhesive intermediate the transducer and housing. Such a form of mounting has been found to be particularly free from failures due to mechanical vibration and thermally induced stresses. More particularly, it will be recognized that vibration occurring external to the housing structure can be transmitted to the transducer only through the narrow band of contact between the housing and transducer and that the transducer essentially is "free-floating" except for restraint applied at a single point. Accordingly, the transducer will tend to "ride out" such vibrations as may occur with minimum resulting strain. Similarly, the use of a single band form of mounting reduces the possibility of failure caused by stresses due to differential thermal expansion of the transducer and housing.

Considering now in greater detail the electro-magnetic transducer of the present invention, reference is again made to Fig. 1. As shown in Fig. 1, transducer 10 includes a core structure comprising a pair of core pieces 26 and 27, composed of ferrite or similar material having a high magnetic permeability, and low magnetic retentivity, and exciting coils, one of which is numbered 28, wound thereon. The core structure of transducer 10 is made in two pieces for convenience in fabrication and assembly, as will be better understood in connection with the description of Fig. 4. Core pieces 26 and 27 are shaped to provide a front gap in the core structure across which the transducer fringing flux is developed, the front gap being occupied by a shim 30 of silver or similar highly conductive material. Plastic terminal blocks, one of which is numbered 31, having wire lead terminals embedded therein are bonded to the core pieces, and the ends of the exciting coil are soldered to said terminal to provide electrical connection between the exciting coil and an external circuit, not shown.

Referring now to Fig. 4, there is shown a perspective view partially exploded of the electro-magnetic transducer of the present invention in order to better illustrate the mode of construction of the transducer. More particularly, as shown in Fig. 4, each of core pieces 26 and 27 is identical and includes a mid-section 32 of substantially rectangular cross-section, a back leg 33 of similar cross-section and a front leg 34. Back leg 33 is disposed at right angles to mid-section 32, while front leg 34 is shaped to provide an outer surface at right angles to mid-section 32 and an inner surface at more than right angles to the mid-section. Thus, front leg 34 has a rectangular cross-sectional area which decreases in area as one proceeds along the leg away from mid-section 32. Front leg 34 and back leg 33 are of corresponding length.

Core pieces 26 and 27 are assembled by juxtaposing the ends of their respective back and front legs, and providing a silver shim 30 of one or two mils thickness and of an area equal to that of the tip of front leg 34 to separate the front legs and provide a gap in the core structure across which the transducer fringing flux is developed. When assembled in this manner, the outer surfaces of front leg 34 form pole-face end 23 of transducer 10, as shown in Fig. 1. Core pieces 26 and 27 are secured in the desired relative position by means of an epoxy resin-glass bead adhesive applied at the junction of the back leg sections of the core pieces and on the inner surfaces of the front legs of the core pieces, the adhesive areas being numbered 35 and 36 in Fig. 1. The epoxy resin-glass bead adhesive utilized preferably comprises a mixture in the proportions 25%-75% of resin-glass beads. An epoxy resin suitable for such application is the Armstrong A-2 adhesive. The glass beads preferably are of 1 to 2 mil diameter, and are dispersed in the resin by suitable means to form a uniform mixture.

The adhesive mixture thus formed has been found to have sufficient bond strength to maintain core pieces 26 and 27 in proper relationship under extreme conditions of mechanical shock and vibration. At the same time, the adhesive selected has a sufficiently low temperature coefficient of expansion to maintain the desired relationship of core pieces over a wide range of temperature variation.

It will thus be seen that the use of clamps or similar means to maintain transducer 10 within housing 11, and to maintain the core pieces of transducer 10 in proper relationship have been completely eliminated from the transducer and housing configuration of the present invention. The elimination of clamps makes it possible to utilize ferrite or similarly brittle and frangible materials as core pieces in a transducer operating in an environment subject to fluctuations in mechanical and thermal conditions.

Generally, it is more convenient to wind the exciting coils and provide terminal connections thereto prior to the assembly of core pieces 26 and 27 in the desired final form. As shown in Fig. 4, exciting coil 28 is wound on the mid-section of core piece 26. In order to take full advantage of the high magnetic efficiency of the ferrite core pieces exciting coil 28 is wound on core piece 26 without the use of bobbins or similar forms which would tend to space the coil from the core an excessive amount. On the other hand, the coil cannot be wound directly on the ferrite core due to the high coefficient of thermal expansion of the copper wire of the coil and the essentially abrasive quality of the surface of the ferrite. That is, under conditions of extended thermal cycling, the coil tends to expand and contract upon the core, and the rubbing action thus produced tends to break down the insulation on the wire of the coil and cause shorts and similar types of electrical failure. Accordingly, it is necessary to interpose a layer of insulating material between the coil and core. A material suitable for such purpose may be conveniently produced directly on the core by coating a section of the core to be covered by the coil with a thin layer of epoxy resin, such as the Armstrong resin heretofore referred to, and dipping the core piece into a quantity of the one to two mil glass beads heretofore described. Upon withdrawing the core piece from the glass beads, it will be found that a substantially uniform single layer of the beads will have adhered to the resin. The resin may then be set by means of a heat treatment according to conventional procedures, which will permanently affix the glass beads to the core. A representation of the insulating surface thus formed is numbered 37, but it should be understood that the size of the beads has been exaggerated for purpose of illustration. Exciting coil 28 may then be wound directly over the resulting glass bead surface.

Alternatively, core pieces 26 and 27 may be coated with a layer of mylar insulating tape or similar insulating material where the thermal conditions to which the transducer is to be subjected will permit such substitution.

Ordinarily, coil 28 will be wound of a fine copper wire, for example, number 39 enamel covered wire. In order to permit connection between the ends of the coils and an external circuit without subjecting the relatively fine wire of the coils to undue stress transmitted through the leads thereto, a plurality of wire lead terminals 25, 25′, etc. are provided. One end of each of terminal leads 25, 25′, etc. is embedded in a substantially rectangular block of plastic insulating material 31, which is bonded to the core piece, while the ends of each of the exciting coils are wrapped about and soldered to an uninsulated segment of the wire lead adjacent the plastic block. Plastic terminal block 31 may be composed of a mixture of the epoxy resin heretofore described and silica filler in the proportions of, for example, 25% resin to 75% filler. Terminal block 31 may be most conveniently formed by providing an appropriately shaped cavity, which in addition has provisions for receiving and retaining terminals 25, 25′, and core piece 26 in the desired final relationship with terminal block 31. Terminal block 31 may then be cast in place and cured in a conventional manner, the curing process serving in addition the purpose of bonding block 31 to core piece 26 and retaining terminals 25 and 25′ within block 30. The ends of coil 28 may then be soldered to terminals 25, 25′ to completed the fabrication of the transducer.

While the embodiment of the transducer of the present invention has been described as including a pair of exciting coils and a plurality of terminals for establishing connections between said coils and an external circuit, it should be understood that obvious modifications using either a greater or a lesser number of coils and terminals are so obvious as to be considered within the scope of the present invention without further description thereof. Similarly, while the coils of the transducer have been described as exciting coils, it should be understood that the transducer is equally operative for either recording, reading or erasing information stored as states of magnetization on a magnetic record.

There has thus been described an easily fabricated, highly efficient and sensitive electro-magnetic transducer and housing therefor which may be operated over a broad range of temperatures, and under conditions of extreme mechanical vibration and shock.

What is claimed as new is:

1. An electro-magnetic transducer and housing comprising: an electro-magnetic transducer; a housing body having a hollow inner cavity for receiving said transducer, said housing body having a base portion with a recess cut out therein, said recess being rectangular in shape and having a length substantially equal to the length of the pole-face end of the transducer to be positioned therein, and a depth slightly greater than the thickness of the pole-face end of said transducer, said base portion having a thickness sufficient to provide an inner surface on said recess to which said transducer may be fastened by adhesive means, and a cover plate for covering the cavity in said housing, said cover plate having a lip protruding into said recess in said base portion when said cover plate is in place, said lip being of sufficient size to close the remaining portion of said recess not occupied by said transducer.

2. The electro-magnetic transducer and housing defined in claim 1 wherein said housing body has an aperture therein for passing electrical leads connected to said transducer.

3. The electro-magnetic transducer and housing defined in claim 1 wherein said housing and said cavity therein are of such dimension that no part of said transducer touches the inside surface of the cavity at any point, said transducer and housing being in contact only along the inner surface on the recess of the base portion of said housing and the edge of the lip of said cover plate.

4. The electro-magnetic transducer and housing defined in clam 1 wherein said transducer is positioned in said housing body with its pole-face end positioned in the recess in said base portion in such manner that the surface of said pole-face end and the outer surface of said base portion are flush and form a continuous surface.

5. A highly efficient electro-magnetic transducer comprising: a pair of core pieces composed of material having high magnetic permeability and low magnetic retentivity, said core pieces each having a mid-section of substantially rectangular cross-section, a back leg of similar cross-section disposed at right angles to said mid-section, and a front leg shaped to provide an outer surface at right angles to said mid-section and an inner surface at more than right angles to said mid-section, said core pieces being disposed with the ends of said back leg juxtaposed, a shim of conductive material separating the tip ends of said front legs, said core pieces being maintained in said relative position by means of a resin-glass bead adhesive applied at the junction of the back leg sections of the core pieces and on the inner surface of the front legs of the core pieces; an exciting coil wound on said core structure; and a plastic terminal block bonded to said core pieces, said plastic terminal block comprising an insulating plastic with a wire terminal lead embedded therein.

6. The electro-magnetic transducer defined in claim 5, including means for thermally, mechanically, and electrically isolating an exciting coil wound on a magnetic core from said core, said means comprising a coating of an adhesive resin disposed on said core and having a substantially uniform layer of glass beads of relatively small dimension embedded therein.

7. The electro-magnetic transducer defined in claim 5, wherein said core pieces composed of matcrial having high magnetic permeability and low magnetic retentivity are each composed of ferrite.

8. An electro-magnetic transducer and housing comprising: an electro-magnetic transducer having a ferrite core; a housing having a hollow inner cavity therein for receiving said transducer, said housing and said cavity being of such dimension that no part of said transducer touches the inner surface of the cavity at any point, said housing having a base portion having an aperture therein, said aperture being of such dimension as to permit the pole-face end of said transducer to pass therethrough, and said base portion being of sufficient thickness to provide an inner surface on said aperture to which said transducer may be adhesively fastened, said cavity being maintained free of any material for transmitting pressure from said housing to said transducer mounted therein.

9. An electro-magnetic transducer and housing comprising: an electro-magnetic transducer having a pair of ferrite core pieces shaped to provide a front gap in one end of the core structure across which fringing flux may be developed; and a housing for supporting and enclosing said transducer, said housing comprising a body portion and a base portion, said body portion having a cavity therein dimensioned to enclose said transducer without contact at any point, said base portion having an aperture therein, said aperture being dimensioned to permit said one end of said transducer to pass therethrough for presentment to a magnetic record body, said aperture and said base portion being dimensioned to provide supporting contact for said transducer about the inner periphery of said aperture.

10. An electro-magnetic tranducer and mounting comprising: an electro-magnetic transducer having a front gap in a pole-face end thereof across which fringing flux may be developed; a housing having a cavity therein for receiving said transducer, said housing having an aperture in one side thereof for passing the pole-face end of said transducer for presentment to a magnetic record body, said housing being dimensioned to contact said transducer only in a narrow band defined by the thickness of the housing at said aperture; and means for adhesively securing said transducer in said housing, said adhesive securing means being confined to the space between said transducer and the inner surface of said aperture.

11. An electromagnetic transducer comprising: a magnetic core having a coil supporting section, an adhesive resin on said coil supporting core section, a layer of glass beads secured in said resin, and a wire coil disposed about said coil supporting core section and having a plurality of wire turns disposed directly on and supported by said glass beads.

References Cited in the file of this patent

UNITED STATES PATENTS

| | | |
|---|---|---|
| 2,354,018 | Heltzer | July 18, 1944 |
| 2,435,871 | Camras | Feb. 10, 1948 |
| 2,628,286 | Rettinger | Feb. 10, 1953 |
| 2,658,113 | Holmes | Nov. 3, 1953 |
| 2,734,941 | Zenel | Feb. 14, 1956 |
| 2,756,280 | Rettinger | July 24, 1956 |
| 2,769,036 | Selsted | Oct. 30, 1956 |
| 2,780,742 | Jenner et al. | Feb. 5, 1957 |